Aug. 30, 1960
B. K. SMITH
2,951,238
INDICATING DEVICE FOR MAGNETIC AMPLIFIERS
Filed Sept. 24, 1954
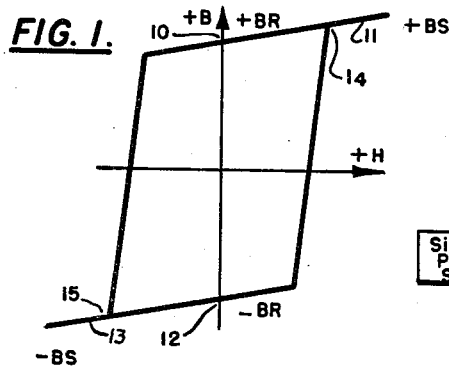
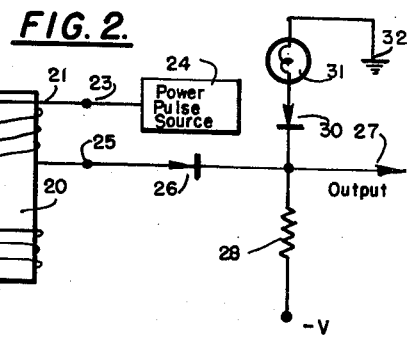
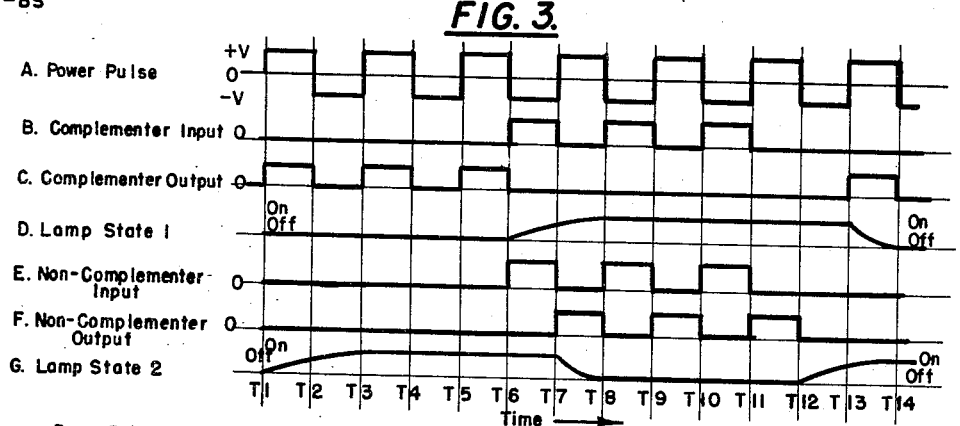
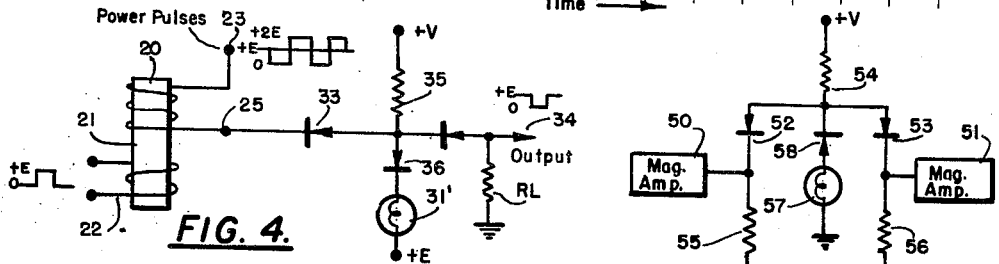
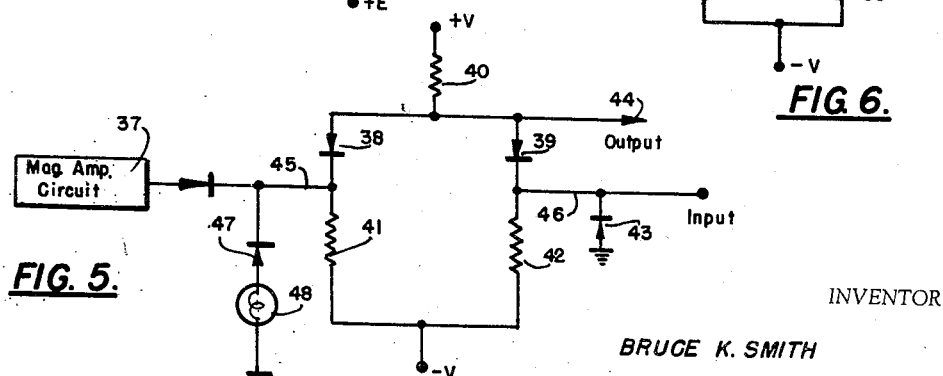
INVENTOR
BRUCE K. SMITH
BY
ATTORNEY

United States Patent Office 2,951,238
Patented Aug. 30, 1960

2,951,238

INDICATING DEVICE FOR MAGNETIC AMPLIFIERS

Bruce K. Smith, Devon, Pa., assignor, by mesne assignments, to Sperry Rand Corporation, New York, N.Y., a corporation of Delaware Filed Sept. 24, 1954, Ser. No. 458,035

10 Claims. (Cl. 340—174)

The present invention relates to indicating devices, and is more particularly concerned with indicators which may be utilized in conjunction with magnetic amplifiers, or with circuits comprising magnetic amplifiers, to provide an indication of the output state thereof.

Magnetic amplifiers and circuits comprising such amplifiers are well known in the prior art. These amplifiers in general comprise a magnetic core preferably, but not necessarily, exhibiting a hysteresis loop which is substantially rectangular in configuration. The said core further carries one or more coils thereon; when two coils are in fact utilized, one is normally termed a power or output winding and the other is termed a signal or input winding. The power winding is ordinarily coupled to a source of power pulses comprising a regularly occurring train of positive and negative going pulses and in response to the selective presence or absence of signals, coupled to the said signal or input winding, the said power pulses selectively produce an output.

If an output is obtained from the power winding in the absence of an input signal to the said signal winding, the amplifier is termed a complementing magnetic amplifier. On the other hand, if an output is obtained only in response to the presence of an input signal at the signal winding, the amplifier is termed a non-complementing magnetic amplifier. These forms of magnetic amplifiers lend themselves readily to circuit configurations such as binary counters, flip-flops, ring counters, shifting registers, half-adders, etc.

It is often desired to obtain an indication of the output state of a magnetic amplifier circuit such as has been discussed. The indicators known to the present time are subject to a number of disadvantages, however. Thus, for instance, prior art indicators often diminish the available output power of the magnetic amplifier when utilized to indicate the output state thereof. Again, indicators of the type heretofore utilized often require the use of transformers or of other circuit components to obtain the proper voltage and/or current for energization of the said indicating device. A further disadvantage present in prior art indicators is that they often comprise a relatively complex circuit having several costly components in addition to the indicating device itself.

The present invention is primarily concerned with novel indicator circuits which serve to obviate the foregoing difficulties.

It is accordingly an object of the present invention to provide an improved indicator circuit.

Still another object of the present invention resides in the provision of an indicator device for use with magnetic amplifier circuits.

Another object of the present invention is the provision of an indicator which does not require the use of a transformer to obtain proper voltage and/or current for operation of the indicating device.

A still futrher object of the present invention resides in the provision of an indicator device for use with magnetic amplifiers and serving to indicate the output state thereof, which indicator does not diminish the available power output of the said magnetic amplifier.

Another object of the present invention resides in the provision of an indicator device which is so located with respect to the various circuit components comprising magnetic amplifier circuits that no major components, other than the indicator itself, are required to produce an operable indicating device.

Still another object of the present invention resides in the provision of an indicator which is less expensive than prior indicators and which may be placed in existing amplifier circuits without affecting the operation of the said amplifier circuits.

In providing for the foregoing objects and advantages, the present invention preferably comprises an indicator device including a series connection of incandescent lamp, rectifier and impedance, the said series connected components being coupled between a source of potential and ground. The impedance, as will be discussed more fully, may comprise an impedance already existing in the amplifier circuit, such as an output load resistor.

The several indicator components are so arranged with respect to an amplifier circuit that, in the absence of an output from the said circuit, a current normally passes through the said impedance, rectifier, and incandescent lamp, thereby to light the said lamp. On the other hand, upon the occurrence of an output from the amplifier, the potential across the said lamp is so changed that it no longer draws current and will, as a result, become extinguished. By this arrangement, a positive indication of the output state of an amplifier is obtained, while at the same time no power is taken from the available output power of the amplifier to operate the said indicator.

The foregoing objects, advantages, construction and operation of my invention, as well as further objects and advantages to be derived therefrom, will be more readily seen from the following description and accompanying drawings, in which:

Figure 1 is an idealized hysteresis loop of a magnetic material which may preferably be employed in the cores of magnetic amplifiers such as may be utilized in conjunction with the indicator of the present invention.

Figure 2 is a schematic diagram symbolically illustrating a simplified magnetic amplifier and an indicator device in accordance with the present invention.

Figure 3 (A through G) are waveform diagrams illustrative of the possible operation of amplifier and indicator circuits such as are illustrated by Figure 2.

Figure 4 is a circuit diagram illustrative of one possible modification in accordance with the present invention.

Figure 5 is a circuit diagram illustrative of a further possible modification in accordance with the present invention; and Figure 6 is a circuit diagram illustrative of a still further possible modification in accordance with the present invention.

Referring now to Figure 1, it will be seen that the magnetic amplifiers of the type contemplated by the present invention, may preferably but not necessarily, utilize magnetic cores exhibiting a substantially rectangular hysteresis loop. Such cores may be made of a variety of materials, among which are the various types of ferrites and various kinds of magnetic tapes, including Orthonik and 4–79 Moly-Permalloy, and these materials may be given different heat treatments to effect different desired properties. In addition to the wide variety of materials applicable, the cores of the said magnetic amplifiers may be constructed in a number of different geometries, including both closed and open paths. It is to be understood that the magnetic amplifier configuration per se does not form a portion of the present invention but that the present invention more properly relates to a novel combination of such amplifiers with my improved indicator device. It is therefore believed unnecessary to discuss in detail the construction or operation of magnetic amplifiers; and reference is made to available text material for a more complete discussion in this respect.

In order to more properly understand the functioning of my indicator device, however, a brief discussion will now be given of the broad operational characteristics of magnetic amplifiers, such as are employed as a portion of the present invention.

Returning to the hysteresis loop shown in Figure 1, it will be noted that the curve shown therein exhibits several significant points of operation, namely, point 10, +Br, which represents a point of plus remanence; the point 11, +Bs, which represents plus saturation; the point 12, −Br, which represents a point of minus remanence; the point 13, −Bs, which represents minus saturation; the point 14, which represents the beginning of the plus saturation region; and the point 15, which represents the beginning of the minus saturation region. If a core exhibiting a hysteresis loop such as is shown in Figure 1 should have a coil thereon, and if the said core should initially be at the plus remanence point 10, a current passed through the said coil in a +H direction, that is in a direction tending to increase the flux through the said core, will tend to drive the core from the point 10, plus remanence, to the point 11, plus saturation. During such a state of operation there is relatively little flux change through the said core and the coil exhibits a relatively low impedance whereby energy supplied to the input of the said coil during this state of operation will pass readily therethrough and may be utilized to effect a usable output.

On the other hand, if the core should initially be at the point 12, minus remanence, prior to the application of a +H magnetizing force, upon application of such a magnetizing force the core will tend to be driven from the said point 12 preferably to the point 14. During this particular state of operation there is a very large flux change through the core and the coil therefore exhibits a relatively high impedance whereby substantially all of the energy applied to the said coil will be expended in flipping the core from point 12 to the region of point 14 rather than in producing a usable output. Thus, depending upon whether the core is initially at point 10 (+Br) or at point 12 (−Br), energy applied in a +H direction will be presented respectively with either a low impedance or a high impedance and will effect either a relatively large output or a relatively small output. These considerations are of great value in the construction of both complementing and non-complementing magnetic amplifiers of the type identified previously.

Referring now to Figures 2 and 3, it will be seen that a generalized magnetic amplifier in accordance with the present invention may comprise a core 20 preferably exhibiting a hysteresis loop of the type discussed in reference to Figure 1, and carrying a power or output winding 21 and a signal or input winding 22 thereon. One end of the power or output winding 21 is coupled at a terminal 23 to a source of positive and negative going power pulses 24 which may be of the type shown in Figure 3A. The other end of the said winding 21 is in turn coupled from a terminal 25 through a rectifier 26 to an output point 27. The output point 27 is in turn coupled through a resistor 28 to a source of negative potential −V. Signal or input coil 22 is coupled to a signal pulse source 29 of any appropriate configuration.

Assuming now that the magnetic amplifier comprising parts 20, 21 and 22 is a complementing magnetic amplifier, let us discuss briefly the operation of such an amplifier. If we should initially assume that the core 20 is at an operating point 10, plus remanence, and that no signal input is received by the winding 22 from the signal source 29, the application of a positive going pulse at terminal 23 during the times t1 to t2, t3 to t4, and t5 to t6, for instance, will cause the said core 20 to be driven from the point 10 to the point 11, as discussed previously, and will therefore give an output at the terminal 27 during each of these time periods. If, however, a signal input should be coupled from the signal source 29 to the input winding 22 during the time t6 to t7, for instance, it should be noted that the polarities of the said signal input and the winding direction of input coil 22 are so selected that during the said time t6 or t7 a magnetomotive force is produced tending to flip the core 20 from the point 10 to the point 15 and thence to the point 12. At time t7, therefore, the core is at its minus remanence point 12 and a positive going power pulse applied via terminal 23 during the time t7 to t8 will be expended in flipping the core from the point 12 to the point 14 rather than in providing a useful output. If no further signal were to be applied during the time t8 to t9, the core 20, being once more at its plus remanence operating point 10, would tend to be driven to positive saturation during the time t9 to t10, once more giving an output. However, if an input is in fact applied during the time t8 to t9, for instance, the core is once more flipped from the point 10 to the point 15 and thence to the point 12 without giving a useful output. Thus, as will be seen from Figures 3B and 3C, so long as an input pulse is not coupled to the winding 22 during the application of a negative going portion of the power pulse from source 24, an output will be obtained from the amplifier during the next succeeding positive going power pulse. The arrangement thus acts as a complementer.

Referring now to Figures 3E and 3F, the operation of a non-complementer will also be readily seen. Let us assume in this respect that the core 20 is initially at the point 12 (−Br) at the time t1. The application of a positive going power pulse at terminal 23 during the interval t1 to t2 will therefore merely flip the core from point 12 to point 14 without giving a useful output whereby, at the time t2, the core 20 will be at point 10, plus remanence. If now a reverse current should be passed through the coil 21 from the terminal 25 to the terminal 23 during the interval t2 to t3, the core will once more be flipped from the point 10 to the point 15 and thence to the point 12 during the time interval t2 to t3. Such a reverse current is in fact supplied in a non-complementer circuit by means not shown in Figure 2 and not necessary to an understanding of the present invention. As a result of this reverse current flow during the occurrence of negative going portions of the applied power pulse, a non-complementing magnetic amplifier in accordance with the present invention is, in the absence of a signal input to the winding 22, successively flipped from its operating point 12 to operating point 10 and thence back to point 12 without there being a useful output from the said amplifier. If, however, an input pulse should be coupled to the winding 22 during a negative going power pulse, and if the polarity of the said pulse and/or the direction of winding of the coil 22 is so preselected that the said input pulse produces a magnetomotive pulse in opposition to that produced by the reverse current flow terminal 25 to terminal 23 via coil 21, the application of such an input pulse will effectively nullify the magnetizing force of the said reverse current flow from terminal 25 to terminal 23. Such input pulses have been assumed to occur during the intervals t6 to t7, t8 to t9, and t10 to t11 (Figure 3E). As a result of these input pulses, the core 20 will find itself still at the point 10, for instance, at the termination of the time intervals t6 to t7, whereby the positive going power pulses occurring during the times t7 to t8, t9 to t10, and t11 to t12, respectively, will cause output pulses to appear, as shown in Figure 3F, at the terminal 27.

Summarizing the showings therefore of Figures 3B and C and Figures 3E and F, it will be seen that a complementing magnetic amplifier in accordance with the present invention will, in the absence of inputs thereto, produce a regularly occurring series of output pulses; while a non-complementing magnetic amplifier in accordance with the present invention will produce a series of output pulses in response only to a series of input pulses. Thus, the output state of a magnetic amplifier such as may be used with the indicator of the present invention will be characterized by either the presence or absence of output pulses at the terminal 27.

If now an indicator device comprising a series connected rectifier 30 and incandescent lamp 31 should in turn be connected between the output terminal 27 and a ground point 32, the indicator 31 will provide a positive indication of the state of amplifier output. Thus, assuming that the amplifier in Figure 2 is a complementing magnetic amplifier, and making reference to the waveform Figure 3D, it will be seen that inasmuch as the said amplifier is producing outputs during the times $t1$ to $t2$, $t3$ to $t4$, and $t5$ to $t6$, these output pulses, which are positive going in nature, are coupled to the output terminal 27 and raise the potential of the said output point 27 to a corresponding positive value. The cathode of rectifier 30 is, therefore, positive with respect to its anode and no current can flow therethrough or through the lamp 31 from ground 32. Thus, when the complementing magnetic amplifier is in fact in an output producing state the lamp 31 passes a low average current whereby the said lamp is caused to be extinguished. The arrangement thus provides a positive indication of this output state, while at the same time not diminishing any of the available output power of the said magnetic amplifier.

If now inputs should be coupled to the complementing magnetic amplifier during the time periods $t6$ to $t7$, $t8$ to $t9$, and $t10$ to $t11$, as shown in Figure 3B, no outputs are obtained from the said amplifier via rectifier 26. During such a state of operation, therefore, current will flow continuously from ground 32 via incandescent lamp 31 and rectifier 30 and thence through impedance 28 to the source of negative potential —V. Accordingly, when no output is obtained from the amplifier the lamp 31 will be lighted by virtue of the increased average current flow therein. If outputs should once more occur from the complementing magnetic amplifier during the time periods $t13$ to $t14$, etc., the average current in the lamp 31 is again reduced and the lamp 31 will be extinguished.

A similar state of affairs will be seen to exist if the amplifier comprising core 20 and windings 21 and 22 is in fact a non-complementing magnetic amplifier. Thus, referring to Figure 3G, it will be seen that during the time interval $t1$ to $t7$, when no output is in fact obtained from the amplifier, a current will flow from ground 32 through lamp 31 and rectifier 30 to impedance 28 and thence to the source of negative potential —V, causing the lamp to be lighted. On the other hand, during the interval $t7$ to $t12$, when outputs are being obtained from the non-complementing magnetic amplifier as shown, the average current in lamp 31 is reduced, causing the lamp 31 to be extinguished, thereby once more giving a positive indication of the amplifier output state. It should be noted, as will be seen in both Figures 3D and 3G, that the lighting and extinguishing times of lamp 31 are not zero and, in fact, the characteristics of the said lamp 31 may be such that several pulse time intervals are required to fully light or extinguish the lamp.

The above discussion has concerned itself with complementing and non-complementing magnetic amplifiers energized by power pulses preferably having a center value of substantially zero volts and exhibiting excursions between +V and —V volts. As is shown in Figure 4, however, the power pulses coupled to terminal 23 may in fact have a center value of substantially +E volts and they then may exhibit excursions between 0 and +2E volts. By employing such an energization source, and by connecting the diode 33 in a direction opposite to that of diode 26 (Figure 2), the output pulses appearing at output terminal 34 will be negative going from a level of substantially +E volts, rather than positive going from zero volts as was the case in the previously discussed embodiments of the present invention. The indicator of the present invention may still be utilized with such an arrangement, however, and may comprise an impedance 35 connected as shown between a source of positive potential +V and an output point of the amplifier, in conjunction with a rectifier 36 and lamp 31' connected in series between the said output point and a source of positive potential +E. The lamp 31' will remain lit, as before, unless a negative going output occurs. If we should consider the potential level +E to be the desired output, therefore, it will be noted that lamp 31' will in fact be lit when the desired amplifier output is present, and will be extinguished when the said desired output is not present.

While the arrangements shown in Figures 2 and 4 indicate that the series connected lamp and rectifier may be coupled to the amplifier output terminal, it should be noted that the indicator of the present invention may conveniently be placed at other points in a magnetic amplifier circuit. Referring again to the preceding discussion, it should be noted that while no usable output is obtained during a flip of the magnetic core from the point 12, minus remanence, to the point 14 and thence to point 10, plus remanence, a small output termed a sneak output may nevertheless be obtained during this state of operation. In practice, magnetic amplifiers in accordance with the present invention eliminate this sneak output by utilizing a so-called sneak suppressor or clamp circuit which may comprise an impedance, connected between a source of negative potential and one end of the power or output winding, and a rectifier connected between the same end of the said power or output winding and ground. In practice, the value of the said impedance is so chosen that, in the absence of a useful output, a current flows from ground through the rectifier and thence through the said impedance to a source of negative potential which current is equal to or greater than the sneak current to be suppressed. By this configuration, therefore, only outputs substantially larger than that of the sneak output will appear at the ultimate output terminal. Such a sneak suppressor may be modified to include an indicator device in accordance with the present invention. The operation and modification of such sneak suppressors may in fact be seen by referring to the figures already presented. Thus, referring to Figure 2 it may be considered that a sneak suppressor is in fact supplied, comprising the resistance 28 coupled as shown between the source of negative potential —V and one end of the power or output winding of the magnetic amplifier circuit, in cooperation with a diode 30 connected between the said one end of the power or output winding and ground. This known sneak suppressor circuit comprising resistor 28 and rectifier 30 may be considered to have been modified, as shown in Figure 2, by the insertion of the incandescent lamp 31 in series with the rectifier 30. In the absence of a useful output from the amplifier circuit a sneak suppression current will flow from ground through lamp 31 and rectifier 30 and thence through resistor 28 to the source of negative potential —V. However, when a useful output is in fact obtained from the said amplifier circuit, the point 27 rises to a positive potential, thereby reducing the average current through the lamp and causing the lamp 31 to be extinguished. Accordingly, a positive indication of the output state is obtained. The same considerations apply to the arrangement shown in Figure 4. In this respect, the sneak suppressor comprises the elements 35, 36, and 31' connected in series between the sources of potential +V and +E. It should be noted that the magnetic amplifier circuits of Figures 2 and 4 (as well as of Figures 5 and 6) may be a simple amplifier of the type discussed, or may in fact comprise any of the circuits previously mentioned which can utilize such amplifiers, such as bistable devices, shifting registers, etc.

Referring now to Figure 5, still another arrangement in accordance with the present invention will be seen. Again, a magnetic amplifier circuit 37 is provided which may take any of the forms previously discussed. In many such circuit arrangements the said amplifier circuit 37 is utilized in conjunction with a gate and one such well known gate configuration has been shown in Figure 5. This gate comprises a pair of rectifiers 38 and 39, the anodes of which are respectively coupled via a resistance 40 to a source of positive potential +V. The cathodes of the rectifiers 38 and 39 are respectively coupled through resistances 41 and 42 to a source of negative potential −V. In addition, a further diode 43 may be coupled between the cathode of diode 39 and ground, as shown, to effectively clamp the output 44 of the said gate to ground.

In practice, the gate is selectively responsive to inputs on lines 45 and 46 which are coupled respectively to the junction of diode 38 and resistor 41 and to the junction of diode 39 and resistor 42. As will be seen from an examination of Figure 5, this known gate configuration may receive inputs on the line 45 from the magnetic amplifier circuit 37, and this gate input already includes a resistor 41 coupled between the said line 45 and a source of negative potential −V. Thus, the principles and operation discussed previously may be effected by coupling a further rectifier 47 in series with an incandescent lamp 48 between the said line 45 and ground. Once more, therefore, in the presence of outputs from amplifier circuit 37 (inputs to the gate on line 45) the lamp 48 will be extinguished, while in the absence of outputs from the said amplifier 37 the lamp 48 will be lighted by current passing via the said lamp and rectifier 47 to the resistor 41 and thence to the source of negative potential −V. It should be noted that the circuit shown in Figure 5 thus provides not only a gate input and an indicating device but further performs in part the function of sneak suppression discussed in reference to Figures 2 and 4.

It should be noted that the input signal appearing on line 46 of the arrangement shown in Figure 5 may in fact comprise the output of a still further magnetic amplifier circuit. This concept may be extended as is shown in Figure 6 to provide an indicator circuit capable of showing coincidence of output from a plurality of magnetic amplifiers while simultaneously providing sneak suppressor action for the said plurality of amplifiers.

Thus, referring to the said Figure 6, it will be seen that two magnetic amplifier circuits 50 and 51 may have their outputs respectively coupled to the cathodes of two diodes 52 and 53. The anodes of the said diodes 52 and 53 may be coupled together as shown and an impedance 54 may be connected between the said common anode connection and a source of positive potential +V. The cathodes of the diodes 52 and 53 may be further coupled via impedances 55 and 56, respectively, to a source of negative potential −V. An indicator in accordance with the present invention again comprises a lamp 57 and a rectifier 58 connected in series with one another and disposed, in accordance with the embodiment shown in Figure 6, between the common anode connection of the diodes 52 and 53, and ground.

In operation, the lamp 57 will be lighted unless outputs occur from each of amplifiers 50 and 51. The arrangement shown in Figure 6 provides sneak suppressors for each of the amplifiers in addition to performing this indicator function. Thus, the sneak suppressor circuit for the amplifier 50 is from ground through lamp 57, rectifier 58, diode 52, and impedance 55 to the source of negative potential −V; similarly, the sneak suppressor circuit for the amplifier 51 is from ground, through the lamp 57, rectifier 58, diode 53, and impedance 56 to the source of negative potential −V. So long as an output occurs from one only of the amplifiers 50 and 51, or from neither of the said amplifiers 50 and 51, a current path is afforded for the flow of a relatively high average current through the said lamp 57. The simultaneous occurrence of outputs from amplifiers 50 and 51, however, reduces the level of current flow through lamp 57 to a relatively low value whereby the lamp becomes extinguished thereby indicating coincidence of output.

While I have discussed preferred embodiments of my invention, it must be emphasized that the foregoing discussion is illustrative only and is not meant to be limitative of my invention. Further variations will suggest themselves to those skilled in the art, in accordance with the principles discussed above and these are meant to fall within the scope of my invention as set forth in the appended claims. Thus, as has been discussed, the magnetic amplifiers may in fact be energized by either negative power pulse or by positive power pulses and the principles described previously apply with equal force to amplifiers employing each of these forms of energization. Similarly, while simple magnetic amplifiers have been used by way of illustration, it is to be understood that the principles discussed apply to relatively complex circuits of the type mentioned previously employing such amplifiers as components thereof. Further, while I have described my indicator in conjunction with pulse type magnetic amplifier circuits, the amplifiers may in fact take the form of carrier type amplifiers wherein the power source is of a much higher frequency than the input or signal source.

Having thus described my invention, I claim:

1. In combination, a magnetic amplifier comprising a magnetic core having a power winding and a signal winding thereon, a source of regularly spaced power pulses coupled to one end of said power winding, a signal source coupled to said signal winding and producing input pulses between selected ones of said power pulses whereby said input pulses control the flow of pulses from said power pulse source through said power winding, first rectifier means for coupling pulses from said power winding to an output point, said first rectifier means comprising an anode and a cathode and having the anode thereof connected to the other end of said power winding and the cathode thereof connected to said output point, and means for indicating the presence and absence of pulses at said output point, said indicating means comprising second rectifier means having an anode and a cathode and having the cathode thereof connected to the cathode of said first rectifier means, incandescent lamp means having one terminal thereof connected to the anode of said second rectifier means, the other terminal of said lamp means being connected to ground, resistor means having one end thereof connected to the common connection of said cathodes of said first and second rectifier means, and means connecting the other end of said resistor means to a source of negative potential, whereby current normally flows between ground and said negative source via said lamp means, second rectifier means, and resistor means in the absence of pulses at said output point, and said second rectifier means is cut off thereby to extinguish said lamp means in response to presence of pulses at said output point.

2. An indicator comprising a permissive gating circuit, said gating circuit including a first diode and a first impedeance connected in series, a second diode and a second impedance connected in series, means coupling said series connected circuits in parallel with one another across a D.C. potential source whereby current normally flows through both said series circuits from said D.C. source, and means for indicating the signal state at a selected point in said parallel circuit comprising a third diode and a lamp connected in series with one another, means coupling said last mentioned series circuit between a further potential source and said selected point in said parallel circuit whereby the current flowing through said third diode and lamp depends upon the relative potentials of said selected point and said further source, and means for selectively changing the potential at said selected point comprising first signal means coupled to the junction of said first diode and first impedance for controlling the current flow from said D.C. source through said first mentioned series circuit, and second signal means coupled to the junction of said second diode and second impedance for controlling the current flow from said D.C. source through said second mentioned series circuit.

3. The circuit of claim 2 wherein each of said first and second signal means comprises a magnetic amplifier.

4. An indicator for indicating the output of a pulse source comprising means producing a plurality of spaced unidirectional pulses, a lamp and a normally conductive diode connected in series with one another across a source of direct potential, and means coupling said unidirectional pulse producing means to one electrode of said diode for selectively altering the potential of said diode electrode in response to said unidirectional pulses to bias said diode in a direction opposite to the direction of normal conductivity of said diode whereby said diode is appreciably conductive in the absence of a unidirectional pulse from said pulse producing means thereby to light said lamp, and said diode is rendered substantially non-conductive in response to unidirectional pulses from said pulse producing means thereby to extinguish said lamp.

5. The combination of claim 4 wherein said pulse producing means comprises a pulse-type magnetic amplifier having an output terminal connected to said diode electrode, a load impedance coupled to said output terminal of said amplifier, said load impedance being connected in series with said diode and lamp across said source of direct potential.

6. An indicator comprising a lamp, a diode, and an impedance connected in series with one another across a source of direct potential, and potential pulse producing means comprising a pulse-type magnetic amplifier having its output coupled to one end of said diode gate means, means coupling the output of said magnetic amplifier to said gate means, said impedance comprising one component of said gate means, said diode being so poled with respect to said source of direct potential that it is appreciably conductive only in the absence of potential pulses from said pulse producing means.

7. In combination, a pulse type magnetic amplifier energized by a source of regularly occurring power pulses, input means coupled to said amplifier, said amplifier including means responsive to said energizing source and input means for selectively producing spaced unidirectional positive-going output pulses, and means for indicating the presence and absence of said output pulses comprising a lamp and a diode connected in series with one another across a source of reference potential, said diode being so poled with respect to said reference potential that said diode is normally conductive and said lamp is normally lit, and means coupling said unidirectional positive-going output pulses to the cathode of said diode whereby said diode is cut off and said lamp is extinguished in response to presence of said unidirectional amplifier output pulses.

8. In combination, a gate circuit having a plurality of input points and an output point, a plurality of signal sources coupled to said input points respectively for selectively controlling the potential at said output point, and indicator means for indicating the potential state at a selected one of said input and output points, said indicator means comprising a source of D.C. reference potential, a rectifier and a lamp connected in series with one another between said selected point and said reference source whereby the current flow through said lamp depends upon the conductivity of said diode as determined by the relative potentials of said selected point and reference source, said gate circuit comprising a portion of the circuit path for current flow through said lamp, said signal sources being operative to selectively change the potential of said selected point thereby to change the relative potentials of said selected point and reference source.

9. The combination of claim 8 wherein the polarity and magnitude of said reference source are so selected with respect to the poling of said diode and the quiescent potential of said selected point that said diode is normally conductive whereby said lamp is normally lit.

10. In combination, a source of spaced pulses, a control circuit coupled to said source and responsive to said spaced pulses, said control circuit including an impedance having one end thereof coupled to a point of first reference potential, the potential at the other end of said impedance in said control circuit being dependent upon the presence and absence of pulses from said source, and means for indicating the presence and absence of pulses from said source comprising an indicating circuit including a diode and lamp connected in series with one another, means coupling one end of said series circuit to said other end of said impedance, and means coupling the other end of said series circuit to a point of second reference potential different from said first reference potential whereby the conductivity of said diode and state of illumination of said lamp varies with variations in the potential of said other end of said impedance relative to said first and second reference potentials, said impedance comprising a portion of the circuit path for current flow through said diode and lamp when said diode is conductive.

References Cited in the file of this patent

UNITED STATES PATENTS

| | | |
|---|---|---|
| 2,640,164 | Giel | May 26, 1953 |
| 2,697,178 | Isborn | Dec. 14, 1954 |
| 2,697,825 | Lord | Dec. 21, 1954 |
| 2,709,798 | Steagall | May 31, 1955 |
| 2,721,947 | Isborn | Oct. 25, 1955 |
| 2,770,739 | Grayson | Nov. 13, 1956 |
| 2,798,168 | Bonn | July 2, 1957 |

OTHER REFERENCES

Publication I, Electronics, January 1950, pp. 84–87.
Thesis by R. C. Minnick, Computation Lab. Harvard Univ. Progress Report No. BL-3, pp. (5–23) and (5–25), placed on file at Harvard Univ. Library on September 16, 1953.